(12) United States Patent
Zięcik

(10) Patent No.: US 12,487,649 B2
(45) Date of Patent: Dec. 2, 2025

(54) POWER MANAGEMENT OF A SYSTEM ON A CHIP USING A KNOWLEDGE-BASED SYSTEM

(71) Applicant: NORDIC SEMICONDUCTOR ASA, Trondheim (NO)

(72) Inventor: Piotr Zięcik, Cracow (PL)

(73) Assignee: Nordic Semiconductor ASA, Trondheim (NO)

( * ) Notice: Subject to any disclaimer, the term of this patent is extended or adjusted under 35 U.S.C. 154(b) by 172 days.

(21) Appl. No.: 18/558,523

(22) PCT Filed: May 2, 2022

(86) PCT No.: PCT/EP2022/061717
§ 371 (c)(1),
(2) Date: Nov. 1, 2023

(87) PCT Pub. No.: WO2022/233791
PCT Pub. Date: Nov. 10, 2022

(65) Prior Publication Data
US 2024/0219983 A1    Jul. 4, 2024

(30) Foreign Application Priority Data
May 3, 2021   (FI) ..................... 20215514

(51) Int. Cl.
*G06F 1/26* (2006.01)
(52) U.S. Cl.
CPC ..................... *G06F 1/26* (2013.01)

(58) Field of Classification Search
CPC ......... G06F 1/26; G06F 1/3203; G06F 1/3206
See application file for complete search history.

(56) References Cited

U.S. PATENT DOCUMENTS

| | | |
|---|---|---|
| 2011/0022859 A1 | 1/2011 | More et al. |
| 2013/0311796 A1 | 11/2013 | Brinks et al. |
| 2018/0183543 A1 | 6/2018 | Kim |

(Continued)

OTHER PUBLICATIONS

Finnish Search Report for FI 20215514 dated Dec. 1, 2021, 1 page.
(Continued)

*Primary Examiner* — Jaweed A Abbaszadeh
*Assistant Examiner* — Gayathri Sampath
(74) *Attorney, Agent, or Firm* — Nixon & Vanderhye PC

(57) ABSTRACT

According to an aspect, there is provided an apparatus for power management of a system on a chip, SoC. The apparatus comprises means for performing the following. The apparatus maintains, in a memory, a knowledge-based system comprising a plurality of rules. Each rule maps a shift from a first to a second SoC state to a set of one or more sequential actions for activating a power tree configuration corresponding to said second SoC state. The apparatus receives a request for adjusting a current power tree configuration so as to match a target SoC state. The apparatus determines a set of one or more sequential actions for activating an optimal power tree configuration for the SoC based on the knowledge-based system using current and target SoC states as an input. Finally, the apparatus adjusts the current power tree configuration according to the set of one or more sequential actions.

19 Claims, 4 Drawing Sheets

(56) References Cited

U.S. PATENT DOCUMENTS

2021/0081209 A1    3/2021   Meswani et al.
2021/0157390 A1*   5/2021   Yardi ..................... G06F 3/014
2021/0255690 A1*   8/2021   Kiss ..................... G06F 1/3234

OTHER PUBLICATIONS

International Search Report for PCT/EP2022/061717 mailed Sep. 6, 2022, 4 pages.
Written Opinion of the ISA for PCT/EP2022/061717 mailed Sep. 6, 2022, 7 pages.
Yusuke Kanno et al., "Hierarchical Power Distribution With Power Tree in Dozens of Power Domains for 90-nm Low-Power Multi-CPU SoCs", IEEE Journal of Solid-State Circuits, vol. 42, No. 1, Jan. 1, 2007, 10 pages.

* cited by examiner

POWER MANAGEMENT OF A SYSTEM ON A CHIP USING A KNOWLEDGE-BASED SYSTEM

CROSS-REFERENCE TO RELATED APPLICATIONS

This application is the U.S. national phase of International Application No. PCT/EP2022/061717 filed May 2, 2022, which designated the U.S. and claims priority to FI 20215514 filed May 3, 2021, the entire contents of each of which are hereby incorporated by reference.

TECHNICAL FIELD

Various example embodiments relate power management of systems on a chip.

BACKGROUND

Systems on a chip (SoCs) are integrated circuits which integrate all or at least most components of a computer or other electronic system. SoCs are often optimized to minimize the power used to perform the various functions of the SoC as many SoCs are limited in terms of their power usage and may require long battery life (e.g., SoCs in smartphones). Also, waste heat from high energy consumption can damage other circuit components if too much heat is dissipated, providing another reason for conserving energy.

To dynamically optimize the runtime power consumption of a given SoC, various power management solutions both internal and external to the SoC itself have been implemented. Power management of a SoC may be implemented, for example, using a separate power management circuit which is configured to dynamically control use of various power management blocks (comprising, e.g., voltage regulators) of the SoC. However, how to adjust the power management blocks (e.g., which voltage regulators to activate and in which order) for a given SoC architecture to achieve a certain operational state of the SoC in an optimal manner is not a trivial question.

BRIEF DESCRIPTION

According to a first aspect, there is provided an apparatus for power management of a system on a chip, SoC, the apparatus comprising means for performing:
  maintaining, in a memory, a knowledge-based system for power management of the SoC, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state;
  receiving a request for adjusting a current power tree configuration of the SoC so as to match a target SoC state;
  determining a set of one or more sequential actions to be carried out to activate an optimal power tree configuration for the SoC based on the knowledge-based system using a current SoC state and the target SoC state as an input; and
  adjusting the current power tree configuration of the SoC according to the set of one or more sequential actions.

According to a second aspect, there is provided a method comprising:
  maintaining, in a memory of an apparatus for power management of a system on a chip, SoC, a knowledge-based system for power management of the SoC, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state;
  receiving, by the apparatus, a request for adjusting a current power tree configuration of the SoC so as to match a target SoC state;
  determining, by the apparatus, a set of one or more sequential actions to be carried out to activate the optimal power tree configuration for the SoC based on the knowledge-based system using a current SoC state and the target SoC state as an input; and
  adjusting, by the apparatus, the power tree configuration of the SoC according to the set of one or more sequential actions.

According to a third aspect, there is provided a computer program comprising instructions for causing an apparatus to perform at least the following:
  receiving a request for adjusting a current power tree configuration of a system on a chip, SoC, so as to match a target SoC state;
  determining a set of one or more sequential actions to be carried out to activate an optimal power tree configuration for the SoC based on a knowledge-based system for power management of the SoC using a current SoC state and the target SoC state as an input, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state; and
  adjusting the current power tree configuration of the SoC according to the set of one or more sequential actions.

The first, second and third aspects provide the technical effect that power tree configuration of a system on a chip (SoC) may be adjusted in an expedient manner (e.g., in an optimal manner in terms of speed or efficiency) to meet the current power needs of the SoC.

The first, second and third aspects provide the advantage that no separate external power management circuit is needed. Also, the dedicated knowledge-based system may be made very small in terms of memory consumption. Relatively little computing resources are required for querying the knowledge-based system of the SoC making it well-suited for use during runtime operation of the SoC.

Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Figure 1:
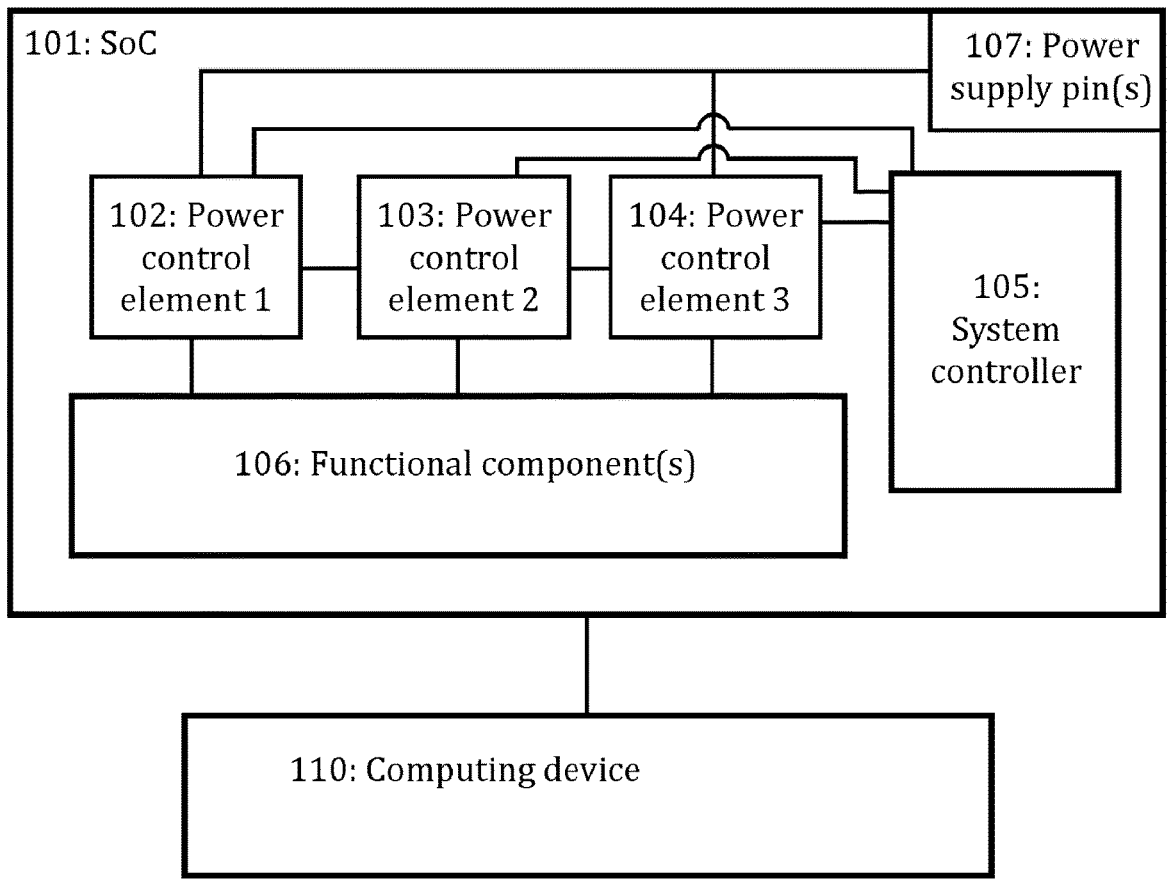
FIG. 1 illustrates a system according to embodiments.

FIG. 1 illustrates a system according to embodiments. Specifically, the system comprises a system on a chip (SoC) integrated circuit 101 and a computing device 110 which may be communicatively connectable to the SoC integrated circuit 101. FIG. 1 corresponds to a schematic diagram showing only elements of the SoC 101 which are of importance in view of the embodiments.

The SoC 101 may be any known SoC comprising one or more functional elements (or units) 106, a plurality of power control elements (in the illustrated non-limiting example, three power control elements 102, 103, 104) providing power to the one or more functional elements 106 in a controlled manner and a system controller 105 for performing power management of the SoC 101 using the plurality of power control elements 102, 103, 104 according to embodiments. The power control elements may be equally called power control or power management devices or circuits. While FIG. 1 illustrates a case where the plurality of power control elements 102, 103, 104 form a part of the SoC 101, in some embodiments, at least one of the plurality of power control elements 102, 103, 104 may be comprised in a separate chip external to the SoC 101 (but connected to it).

The one or more functional elements 106 may be any known hardware functional elements found in SoC integrated circuits. At least some of the one or more functional elements 106 may be active elements requiring electrical power for operation (i.e., the functional elements 106 may acts as load devices for the plurality of power control elements 102, 103, 104). The amount of electrical power required, at a given time, may be dependent on which of the functional elements 106 require power at a given time and the particular configurations of those functional elements (which may change dynamically). This power may be provided via one or more power rails connected to the plurality of regulators 102, 103, 104.

Specifically, the one or more functional elements 106 may comprise, for example, one or more processor cores, one or more memories, one or more interfaces and/or one or more peripherals.

The one or more processor cores may comprise, e.g., one or more microcontrollers, one or more microprocessors, one or more digital signal processors (DSPs) and/or one or more application-specific instruction set processor (ASIP) cores. The processor cores may form one or more processors or central processing units (CPUs). In some embodiments, the one or more functional elements 106 may comprise a plurality of processors cores.

The one or more memories utilized by at least the one or more processors may comprise one or more memories of any of the following types: a read-only memory (ROM), random-access memory (RAM), magnetoresistive random-access memory (MRAM), electrically erasable programmable ROM (EEPROM) and/or flash memory.

The one or more interfaces may comprise one or more external interfaces at least some of which may be associated with particular communication protocols. The supported communication protocols may comprise, for example, any of universal serial bus (USB), FireWire, Ethernet, universal synchronous and asynchronous receiver-transmitter (USART), serial peripheral interface (SPI), high-definition multimedia interface (HDMI), inter-integrated circuit ($I^2C$). Additionally or alternatively, one or more wireless communication protocols may be supported. The one or more wireless communication protocols may comprise, for example, Wi-Fi, Bluetooth, IPV6 over Low-Power Wireless Personal Area Networks (6LoW-PAN) and/or near-field communication. Additionally or alternatively, the one or more interfaces may comprise one or more analog interfaces such as analog-to-digital and/or digital-to-analog converters, e.g., for signal processing. The analog interfaces may be able to interface with different types of sensors or actuators.

The one or more peripherals may comprise, for example, one or more radio peripherals or units, one or more sensors and/or one or more actuators. A radio peripheral or unit may correspond to radio receiver, transmitter or transceiver configured to transmit and/or or receive of radio signals at a specific frequency range. In some embodiments, the one or more peripherals may comprise one or more timing sources of any of the following types: a counter-timer, a real-time timer and/or a power-on reset generator. The one or more peripherals may comprise internal and/or external peripherals of the SoC 101.

The plurality of power control elements 102, 103, 104 are, in general, elements (i.e., circuits) which in some way modify or transform the input power fed to them either via the one or more power supply bins (as illustrated with elements 102, 104) or via other power control elements (as illustrated with element 103 being connected to elements 102, 104) and provide the modified power as output. This modification may pertain, e.g., to regulation, conversion and/or switching on/off of the power. Correspondingly, the plurality of power control elements 102, 103, 104 may comprise one or more elements of one or more of the following types: voltage regulator (or simply regulator), voltage converter (or simply converter), power switch and/or voltage selector (or simply selector). The power switch may be specifically used for switching a connection to a power supply bin or other power source (e.g., power outputted by one of the other power control elements 102, 103, 104) on and off. The voltage selector may be used for selecting from which power rail (or from which power supply bin 107) a given circuit of the SoC 101 is powered.

In some embodiments, the plurality of power control elements 102, 103, 104 comprise one or more regulators (or optionally a plurality of regulators). The one or more regulators serve to regulate their input power (or equally input voltage) provided via one or more power supply pins 107 of the SoC 101 or via another power control element (e.g., element 103 which may be a regulator fed by power control elements 102, 104 powered the one or more power supply bins 107) and supply the regulated power to the one or more functional elements 106 (or to at least some of them). The one or more power supply pins 107 may be powered using external and/or internal voltage sources of the SoC 101. Each output of the plurality of regulators 102, 103, 104 may be connected to at least one power rail powering the one or more functional elements 106. Conversely, each of the one or more functional elements may be provided power via one or more of the plurality of regulators 102, 103, 104 at a time depending on the configuration of the plurality of regulators 102, 103, 104. The plurality of regulators 102, 103, 104 may be arranged in series and/or in parallel relative to each other.

Said one or more regulators comprised in the plurality of power control elements 102, 103, 104 may comprise one or more linear regulators (of series and/or shunt type) and/or one or more switching (or DC-DC) regulators. The one or more linear regulators may comprise, for example, one or more low-dropout (LDO) regulators which are DC linear voltage regulators that provide a regulated voltage level which may be very close to the input voltage of the LDO regulator (i.e., there is minimal voltage drop). Additionally or alternatively, the one or more switching regulators may comprise one or more (high voltage) buck regulators. At least one of the one or more switching regulators may be a single-inductor multiple-output (SIMO) switching regulator (e.g., a SIMO buck regulator). As the name implies, the SIMO switching regulators provide the benefit of requiring only a single inductor acting as an energy storage element for multiple outputs, as opposed to a single inductor per output as with normal switching regulators.

At least some of the one or more regulators may require an external (i.e., off-the-chip) capacitor or inductor at their output. Other regulators of the one or more regulators may comprise an on-chip or on-die capacitor or inductor, instead of the external capacitor or inductor.

In some embodiments, at least one of the one or more regulators may be configurable to operate in a bypass mode. As the name implies, in bypass mode, the regulator in question effectively bypassed so that the output voltage of the regulator tracks the input voltage of the regulator. In practice, the output voltage may be equal to the input voltage minus a pre-defined voltage drop caused by a bypass circuit implementing the bypass mode.

By configuring the one or more power control elements 102, 103, 104 in different ways different SoC (operational) states may be reached. For example, in a given configuration, each regulator (or converter) may be, e.g., activated or deactivated, set to output a voltage having a particular value and/or matching a particular property (e.g., noise level) or set to operate in a bypass mode. Similarly, in a given configuration, each power switch may be switched on or off and each voltage selector may be configured for selecting one of a plurality of possible power rails. A SoC state may be defined through one or more (current) operational properties (or requirements) of the SoC. A particular SoC state may, for example, correspond to a particular value for a dynamic frequency and voltage scaling operating point (DFVS OP) of at least one processor (core) of the SoC 101, whether one or more external and/or internal peripherals (e.g., a radio peripheral) are activated or deactivated and/or one or more voltage values for one or more power supply pins 107 of the SoC 101.

A configuration of the plurality of power control elements 102, 103, 104 of the SoC 101 may be equally called a power tree configuration of the SoC 101. In general, a power tree is a (graphical) representation of the power management architecture of a system. The power tree illustrates the main supply power flow through a "tree" of power regulators (or converters) that convert the main supply power to the voltage and current required to drive various load devices. Each SoC state may have unique power consumption requirements requiring a unique power tree configuration. Also, switching from a first SoC state to a second SoC state may require a set of actions to be performed in a particular order to reach the desired power tree configuration corresponding to the second SoC state.

The system controller 105 may be configured to perform various control functions of the SoC 101 such as control of one or more memories of the SoC 101, cache control, control of a radio peripherical of the SoC 101 (e.g., phase-locked loops and/or oscillators therein), control of one or more timing sources, control of a debug unit of the SoC 101, brownout detection and/or control of powering on/off and/or resetting of the SoC 101. Most notably in view of the embodiments, the system controller 105 may be configured to perform power management, that is, to dynamically configure the plurality of power control elements 102, 103, 104 in a desired manner. In general, the system controller 105 may comprise at least one processor and at least one memory comprising computer program code for implementing the aforementioned control functions.

The power tree configuration may be carried out, by the system controller 105, according to a knowledge-based system (or specifically a rule-based system) maintained in a memory of the SoC 101 (or specifically of the system controller 105), as will be described in detail below.

In some embodiments, the SoC integrated circuit 101 may be communicatively connectable to a computing device 110. The computing device 110 may be, for example, a laptop or desktop computer or a (cloud) server. The computing device 110 may be connectable to the SoC 101 via a wired or wireless link or via at least one communication network for sharing data with the SoC 101. It should be emphasized that while FIG. 1 shows a connection between the SoC 101 and the computing device 110, said connection is not needed during runtime operation of the SoC according to embodiments.

The computing device 110 may be used to generate and maintain in a memory a knowledge-based system for deriving power management information regarding a plurality of different SoC architectures (including the SoC architecture of the SoC 101) and associated circuit board configurations. A circuit board configuration may define, for example, whether one or more off-chip circuit elements (e.g., inductors) and/or one or more external regulators are included in the board. If they are, the circuit board configuration may further define one or more properties of said off-chip inductors (e.g., inductance value of an inductor) and/or external regulators (e.g., type of the regulator). Knowing the specifications of a particular SoC architecture and a particular circuit board used with said SoC architecture, a SoC architecture/board configuration-specific knowledge-based system may be derived, by the computing device 110 based on the more general knowledge-based system maintained in the memory of the computing device 110 and subsequently stored to a memory of the SoC (e.g., a memory of the system controller 105). By using the SoC architecture/board configuration-specific knowledge-based system, memory may be saved as the SoC architecture/board configuration-specific knowledge-based system is much simpler and thus smaller in bytes. Moreover, querying the SoC architecture/board configuration-specific knowledge-based system requires considerably less computing resources compared to the more general knowledge-based system and is thus better suited for use during runtime operation of the SoC 101.

While FIG. 1 shows an architecture where power management functions (e.g., the power control elements 102, 103, 104) form a part of the SoC 101, in some alternative embodiments, the power management may be carried out by a separate power management integrated circuit (PMIC) electrically connected to the SoC. In such embodiments, the PMIC may be controlled by the system controller or other element of the SoC.

Figure 2:
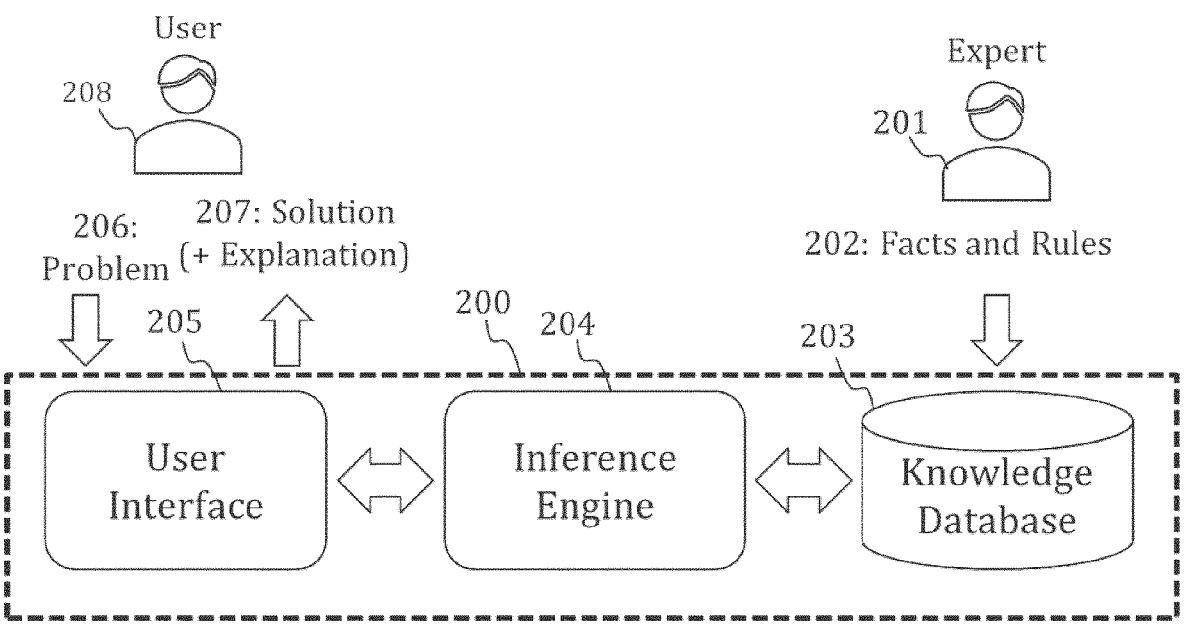
FIG. 2 illustrates a knowledge-based system architecture.

FIG. 2 illustrates the general architecture for a knowledge-based system 200. To facilitate the following discussion on embodiments pertaining to the SoC integrated circuit, the general knowledge-based system for SoC power management based on which a SoC architecture specific knowledge-based system may be derived is discussed in the following in connection with FIG. 2.

A knowledge-based system 200 is, in general, a form of artificial intelligence (AI) that aims to capture the knowledge of human experts to support decision-making. The architecture of a knowledge-based system 200, which informs its problem-solving method, typically comprises a knowledge database 203, an inference engine 204 and a user interface 205.

Knowledge-based systems used in embodiments may be specifically rule-based expert systems, i.e., rule-based systems which rely on human expertise for defining the rules (and associated facts to which the rules are applied). This is illustrated in FIG. 2 as a human expert 201 which defines a plurality of facts and rules based on which the knowledge-based system 200 operates. Said facts and rules are maintained in the knowledge database 203. Here, the plurality of facts and rules may relate specifically to power tree configurations of SoC integrated circuits of different architectures. The rules (or at least some of them) may be defined specifically as if-then statements.

Said facts may relate to properties of circuit boards, regulators, power supply pins, peripherals, processor cores and/or other SoC elements of different SoC architectures. For example, said facts may comprise any of the following information for one or more different SoC architectures:
  included regulator(s) and their types and connections (e.g., outputs),
  included power switches(s) and their connections,
  included voltage selector(s) and their connections,
  peripheral(s) of the SoC,
  allowed voltage range for one or more power supply pins,
  one or more power supply pins connected to one or more regulators,
  power supply pins connected via power rail(s) to each other,
  one or more power supply pins connected to external power supplies,
  input voltage required for one or more regulators via corresponding power supply pin(s),
  output voltage range for one or more regulators in a particular operating mode and
  configuration of one or more regulators (e.g., operating modes available).

The term "range" may be defined, here and in the following, to include bounded ranges, left-bounded and right-un-bounded ranges and right-bounded and left-un-bounded ranges (i.e., ranges of the type $0.5<U<1$, $U>0.5$ and $U<1$ or the same including one or both limit points). Similarly, a set of facts may be defined for each circuit board configuration.

For example, said facts may comprise any of the following information for one or more different circuit board configurations:
  included off-chip circuit element(s) and their types, connections and properties and
  properties of external regulators, and their types and connections.

Each or at least some of the facts listed above may be associated with a set of one or more requirements. For example, a fact in the knowledge-based system may define that a particular SoC architecture includes a radio peripheral. The knowledge-based system may comprise the associated requirement that the radio peripheral needs to be supplied with low noise power and that only certain selected regulator modes are able provide such a clean supply of power.

The rules may be specifically rules relating to configuration of circuit boards, regulators, power supply pins, peripherals, processor cores and/or other SoC elements of different SoC architectures. For example, said rules may comprise rules defining one or more of the following rules relating to regulator operation for one or more different regulators of one or more different SoC architectures:
  activating a regulator of the SoC enables setting its output voltage (to a value larger than zero),
  deactivating a regulator of the SoC sets its output voltage to zero,
  enabling a bypass mode of a regulator of the SoC sets its output voltage to a value equal to input voltage minus pre-defined voltage drop and
  disabling a bypass mode of a regulator of the SoC enables setting its output voltage (to a value larger than zero).

Similar rules may be defined for an external regulator of a given circuit board configuration. In some embodiments, all or at least some of said actions may be associated with facts defining a time value indicating the duration of the given action (e.g., the time it takes to enable bypass mode for a particular regulator is equal to 10 μs). A further rule may be defined for changing a configuration of a system (i.e., a particular SoC) to match a desired configuration (i.e., changing configuration of each regulator of the system to match a desired configuration).

In some embodiments, the rules may comprise at least one rule for calculating a regulator configuration cost for a given configuration of a regulator and/or system configuration cost for a given power tree configuration. This enables comparing different power tree configurations to each other. For example, the regulator configuration cost may be defined to be equal to a first value (e.g., zero) if the regulator is disabled, a second value (larger than the first value) if the regulator is enabled but in bypass mode and a third value (possibly dependent on the efficiency of the regulator) if the regulator is enabled and not in bypass mode. The system configuration cost may be defined, for example, as a sum of the regulator configuration costs of the SoC. In some embodiments, the system configuration cost may also be dependent on configuration (cost) of other power control elements (e.g., configuration of one or more power switches and/or one or more voltage selectors) in the system. The regulator and/or system configuration cost may be used by the inference engine 204 for determining the optimal power tree configuration for a given SoC architecture.

The inference engine 204 may be used for deducing insights from the information (i.e., facts and rules) maintained in the knowledge database 203. A user may pose different problems 206 to the interference engine 204 via a user interface 205. Subsequently, the inference engine 204 solves the problem based on the facts and rules maintained in the knowledge database 203 and returns a solution to the user 208. In general, the user interface 205 enables the user interact with the inference engine 204 and the knowledge database 203.

The knowledge-based system 200 may be used for deriving answers, for example, to any of the following questions:
Which regulators we should use to power a given rail?
How to configure them?
What are their requirements?
What is the most efficient power tree configuration for a given SoC state (e.g., which has the lowest configuration cost)?
How to traverse from a first SoC state to a second SoC state (or from a first power tree configuration to a second power tree configuration)?
How long does it take reach a given SoC state (or power tree configuration)?

The inference engine 204 may be used for finding, using the knowledge database 203, a set of one or more sequential actions for shifting from a first SoC state to a second SoC state for a particular SoC architecture and circuit board configuration (corresponding to a shift from a first power tree configuration to a second power tree configuration). In some cases, several sets of one or more sequential actions may be derived for the same change of SoC state for the same SoC architecture. Correspondingly, a particular SoC state may be reached by implementing one or more different power tree configurations. These alternatives may differ from each other in terms of configuration time and/or configuration cost. The inference engine 204 may be specifically used for determining the optimal solution. As mentioned above, SoC state may correspond, e.g., to a particular value for a dynamic frequency and voltage scaling operating point (DFVS OP) of at least one processor (core) of the SoC, whether one or more external and/or internal peripherals (e.g., a radio peripheral) are activated or deactivated (ON or OFF) and/or one or more voltage values for one or more power supply pins of the SoC.

Any solutions derived by the knowledge-based system 200 may be stored to the knowledge database 203 and used for solving subsequent queries. In other words, further (more complicated) rules may be derived and stored to the knowledge database 203 based on the completed queries.

While embedding a knowledge-based system 200 as described above in a SoC (e.g., in a system controller of the SoC) is possible (and enables automatic selection of the best power tree configuration), the memory and computational power requirements of such an approach are high. Therefore, according to embodiments, the knowledge-based system 200 is ran on a separate computer (e.g., a computing device 110 of FIG. 1) so as to generate a pre-computed power management solution (i.e., a more limited rule-based system) which will be valid within specified bounds, that is, for a specific SoC architecture and circuit board configuration. This new system embedded in the SoC is considerably more limited in terms memory and power requirements and thus suitable even for runtime operation as a part of the SoC. Also, as a change of the SoC power supply scheme is not possible without moving the SoC to another board, it may be assumed that the power supply scheme will be static the lifetime of the SoC integrated circuit. The generation of the SoC/board-specific knowledge-based system is described in more detail in connection with FIG. 5.

Figure 3:
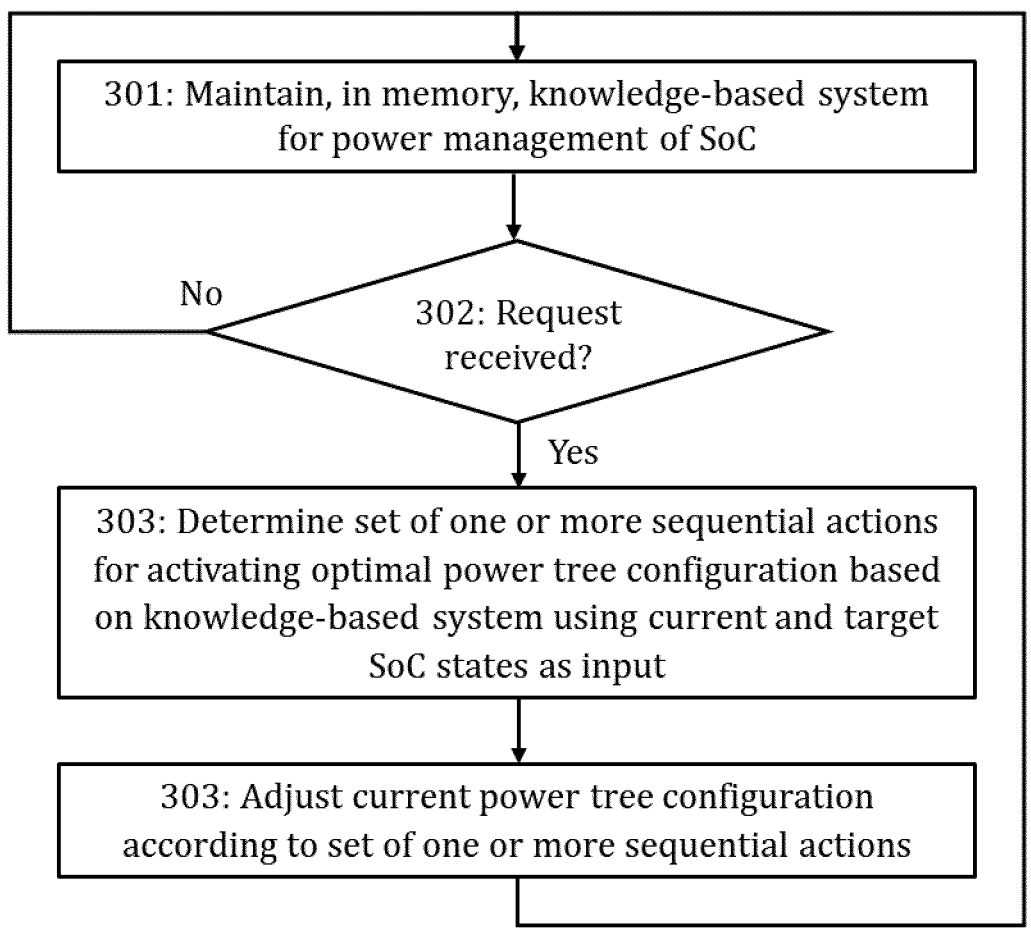
FIGS. 3 to 5 illustrate processes according to embodiments.

FIG. 3 illustrates a process of dynamically adjusting the power tree configuration of a SoC using a knowledge-based system. The SoC as discussed here may be defined as discussed in connection with FIG. 1. The illustrated process may be carried out by a system controller or another apparatus or computing device comprised in the SoC or communicatively connected thereto. Specifically, the illustrated process may be carried out by the system controller 105 of FIG. 1. The apparatus carrying out the process may be electrically connected to a plurality of power control elements (e.g., regulators) comprised in or connected to the SoC for enabling power management of the SoC. In the following, the device performing the process is called simply an apparatus.

Referring to FIG. 3, the apparatus maintains, in block 301, in a memory, a knowledge-based system (or specifically a rule-based system) for power management of the SoC. The knowledge-based system may be specific to a particular SoC architecture of the SoC and a particular circuit board configuration, as opposed to being a more general knowledge-based system as described in connection with FIG. 2. However, the basic architecture of the knowledge-based system 200 of FIG. 2 may apply equally for this SoC/board-specific knowledge-based system, that is, the knowledge-based system may comprise a user interface, an inference engine and a knowledge database as depicted in FIG. 2.

The knowledge-based system comprises (in a knowledge database) a plurality of rules, similar to as described above in connection with FIG. 2. Each of the plurality of rules (or at least some of them) may map a shift from a first SoC state of the SoC to a second SoC state of the SoC at least to a set of one or more sequential actions starting from the first SoC state for activating a power tree configuration (or specifically an optimal power tree configuration) corresponding to said second SoC state. Preferably, at least one set of one or more sequential actions comprised in the knowledge-based system comprises a plurality of sequential actions. A given power tree configuration may correspond to a particular configuration of the plurality of power control elements of the SoC (comprising, e.g., one or more regulators, one or more power switches and/or one or more voltage selectors).

In some embodiments, at least one shift from a first SoC state of the SoC to a second SoC state of the SoC may be mapped, according to at least one rule defined in the knowledge-based system, to zero sequential actions indicating that no change to the power tree configuration is necessitated by the change of the SoC state.

In some embodiments, the plurality of rules may comprise, for one or more pairs of first and second SoC states, two or more rules defining a shift from the first SoC state to the second SoC state to two or more respective sets of one or more sequential actions starting from the first SoC state for activating two different power tree configuration corresponding to said second SoC state. In other words, multiple alternative ways for reaching the second SoC state starting from first SoC state may be defined via two or more rules. Said two or more rules may differ, e.g., in terms of the number and type of the set of one or more sequential actions, the duration of completing the set of one or more sequential actions and/or the power tree configuration and its electrical efficiency.

Similar to as described above, a SoC state may be defined through one or more (current) operational properties (or requirements) of the SoC. A particular SoC state may, for example, correspond to a particular value for a dynamic frequency and voltage scaling operating point (DFVS OP) of at least one processor (core) of the SoC, whether one or more external and/or internal peripherals (e.g., a radio peripheral) are activated or deactivated and/or one or more voltage values for one or more power supply pins of the. Dynamic voltage and frequency scaling (DVFS) is a well-known method for matching system power consumption with required performance in real time. DVFS OP may be controllable, e.g., by adjusting a particular output of a particular power control element (e.g., a particular regulator) of the SoC. Each shift between SoC states defined in the plurality of rules may be defined as a shift from a first SoC state to a second SoC state differing from the first SoC state by at least one operational property of the SoC.

The one or more properties of the SoC defining a SoC state in the knowledge-based system maintained in the memory in block 301 may comprise, for at least one SoC state comprised in the knowledge-based system, one or more properties of one or more of the following types:
  a value for the DFVS OP of a processor of the SoC,
  an ON/OFF state of an internal peripheral of the SoC,
  an ON/OFF state of an external peripheral of the SoC and
  a voltage value or a range of voltage values for a power supply pin of the SoC (possibly provided by an external voltage source).

The sets of one or more sequential actions (or at least one of them) defined in the knowledge-based system maintained in the memory in block 301 may comprise at least one or more actions relating to changing one or more configurations of one or more regulators of the SoC. Said one or more actions relating changing a configuration of a regulator may, e.g., correspond to one or more actions of one or more of the following types:
  activating a regulator of the SoC,
  deactivating a regulator of the SoC,
  setting an output voltage of a regulator of the SoC to a certain value,
  enabling a regulator of the SoC and setting an output voltage of a regulator of the SoC to a certain value,
  enabling a bypass mode of a regulator of the SoC,
  disabling a bypass mode of a regulator of the SoC,
  disabling a bypass mode of a regulator of the SoC and setting an output voltage of a regulator of the SoC to a certain value and
  changing one or more (output) properties (e.g., noise level) of a regulator.

Additionally or alternatively, the sets of one or more sequential actions (or at least one of them) defined in the knowledge-based system maintained in the memory in block 301 may comprise at least one or more actions relating to changing one or more configurations of one or more power switches of the SoC. Said one or more actions relating changing a configuration of a power switch may correspond, e.g., to one or more actions of one or more of the following types:
  switching on a power switch and
  switching off a power switch.

Additionally or alternatively, the sets of one or more sequential actions (or at least one of them) defined in the knowledge-based system maintained in the memory in block 301 may comprise at least one or more actions relating to changing one or more configurations of one or more voltage selectors of the SoC. Said one or more actions relating changing a configuration of a voltage selector may correspond, e.g., to one or more actions relating to selecting an output voltage of a voltage selector from a plurality of input voltages fed to the voltage selector.

The apparatus receives, in block 302, a request (or a command or a message) for adjusting a current power tree configuration of the SoC so as to match a target SoC state (defined in the request). The current power tree configuration may be assumed to be known to the apparatus. The request may be received from another unit of the SoC or from outside the SoC via an interface of the SoC.

The apparatus determines, in block 303, a set of one or more sequential actions to be carried out to activate an optimal power tree configuration for the SoC based on the knowledge-based system using a current SoC state and the target SoC state as an input. The current SoC state may be continuously or periodically monitored by the apparatus and thus known to the apparatus. The set of one or more sequential actions determined in block 303 may comprise one or more actions of one or more of the following types defined above in connection with block 301. The optimal power tree configuration may be specifically optimal in terms of efficiency of the one or more power control elements used (or specifically in terms of efficiency of one or more regulators used) or time required for the activation or a combination of the two factors. The efficiency may refer, here and in the following, specifically to electrical efficiency (equally called power efficiency or electrical power efficiency).

The apparatus adjusts, in block 304, the current power tree configuration of the SoC according to the set of one or more sequential actions (i.e., performs or causes performing the set of one or more sequential actions). As illustrated in FIG. 1, the apparatus (e.g., the system controller 105) may be electrically connected to the plurality of power control elements powering the SoC for performing the reconfiguring.

In the following, a few non-limiting examples are provided for adjustments to the power tree configuration of a SoC which may be carried out using the method of FIG. 3.

In a first example, the power tree configuration of the SoC is requested, in block 302, to be changed to match a change of DVFS OP from 0.8 V to 0.6 V. It is determined based on the knowledge-based system in block 303 that this change corresponds to simply setting an output voltage of a particular LDO regulator of the SoC to 0.6 V. This adjustment is then performed in block 304.

In a second example, the power tree configuration of the SoC is requested, in block 302, to be changed to account for switching off of a radio peripheral of the SoC. It is determined based on the knowledge-based system in block 303 that this change corresponds to, first, setting an output voltage of a particular LDO regulator of the SoC to 0.83 V and then enabling bypass mode in another LDO regulator of the SoC. This adjustment is then performed, in this specific order, in block 304.

In a third example, it is requested, in block 302, to modify the power tree configuration to take into account change of voltage provided to a particular power supply pin of the SoC from a value smaller than 2.41 V to a value larger than or equal to 2.41 V. It is determined based on the knowledge-based system in block 303 that this change requires, first, enabling a particular high-voltage buck regulator of the SoC and setting an output voltage of said buck regulator of the SoC to 1.71 V and then disabling another LDO regulator of the SoC. This adjustment is then performed, in this specific order, in block 304.

Figure 4:
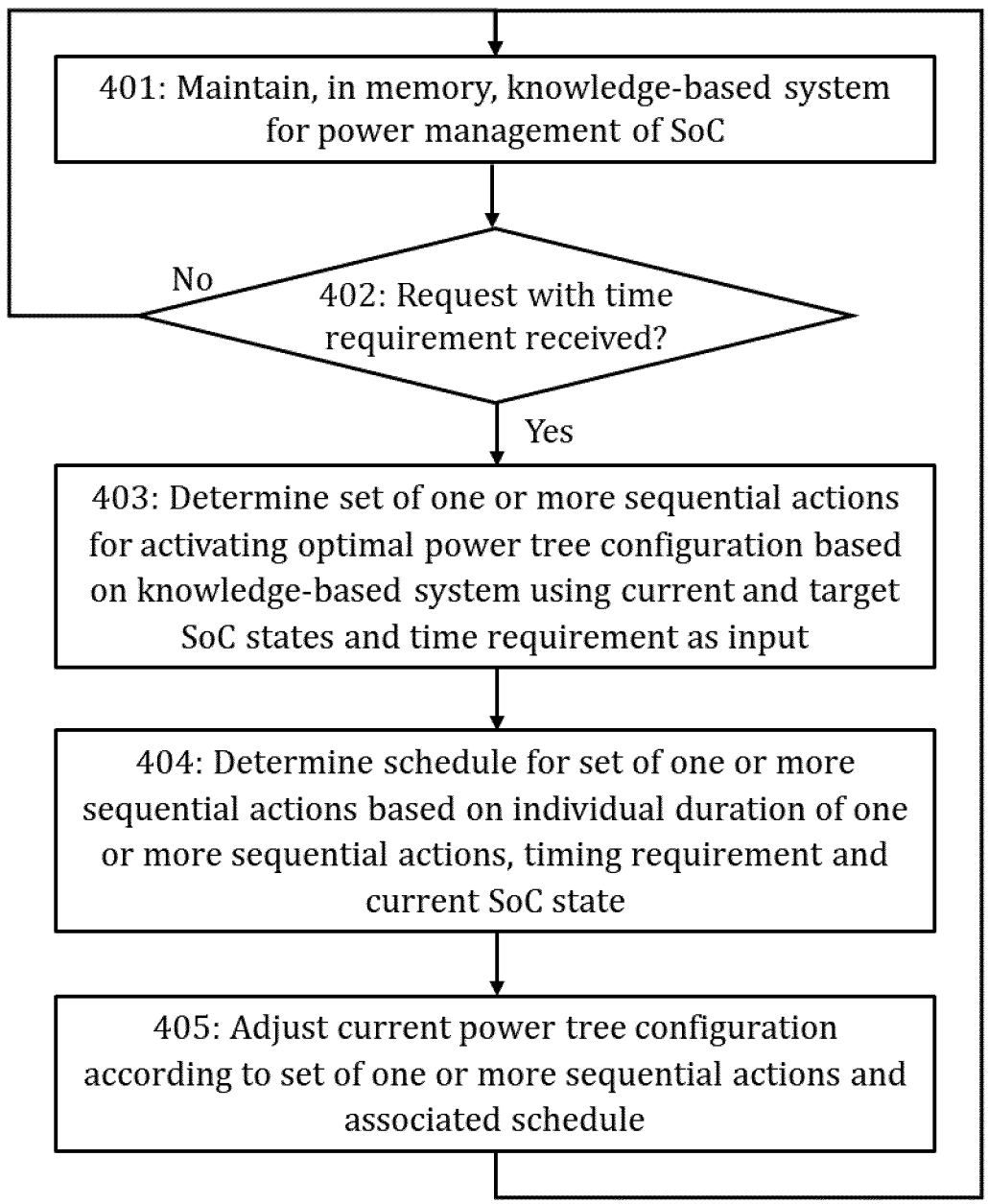

FIG. 4 illustrates another process of dynamically adjusting the power tree configuration of a SoC using a knowledge-based system. The SoC as discussed here may be defined as discussed in connection with FIG. 1. The illustrated process may be carried out by a system controller or another apparatus or computing device comprised in the SoC or communicatively connected thereto. Specifically, the illustrated process may be carried out by the system controller 105 of FIG. 1. The apparatus carrying out the process may be electrically connected to a plurality of power control elements (e.g., regulators) comprised in or connected to the SoC for enabling power management of the SoC. In the following, the device performing the process is called simply an apparatus.

The process of FIG. 4 corresponds to a large extent to the process of FIG. 3. Any of the features discussed in connection with the process of FIG. 3 apply, mutatis mutandis, for the process of FIG. 4, unless explicitly stated otherwise.

Referring to FIG. 4, the apparatus maintains, in block 401, in a memory, a knowledge-based system (or specifically a rule-based system) for power management of the SoC. The knowledge-based system may correspond to the knowledge-based system discussed in connection with block 301 of FIG. 3 with one additional feature. Namely, the plurality of rules (or at least some of them) defined in the knowledge-based system maintained, in the memory, also map the shift from the first SoC state to the second SoC state to a total duration for the set of one or more sequential actions for activating a power tree configuration and/or to one or more individual durations for one or more respective sequential actions in the set (in some embodiments, at least the latter). In other words, according to the latter alternative, each action defined in the knowledge-based system may be associated with a particular duration for carrying out said action.

The apparatus receives, in block 402, a request (or a command or a message) for adjusting a current power tree configuration of the SoC so as to match a target SoC state (defined in the request). The current power tree configuration may be assumed to be known to the apparatus. The request may be received from another unit of the SoC or from outside the SoC via an interface of the SoC. Here, it is further assumed that the request comprises a timing requirement defining a time or time range when the target SoC state should be reached. The time range may be defined, e.g., as a time range starting from the current time and ending at a predefined future time point (i.e., defining that the target SoC should be reached at the latest at said pre-defined future time) as a time range starting from a first future time point and ending at a second, later future time point. In some alternative embodiments, the timing requirement may be retrieved from a memory of the SoC based on the request, as opposed to being received as a part of the request.

The apparatus determines, in block 403, a set of one or more sequential actions to be carried out to activate an optimal power tree configuration for the SoC while ensuring that the timing requirement is satisfied based on the knowledge-based system using a current SoC state, the target SoC state and the timing requirement as an input. In other words, the apparatus determines the optimal set of one or more sequential actions which satisfy the timing requirement by taking into account the time information included in the knowledge-based system (i.e., the durations for individual actions and/or for sets of actions). The current SoC state may be continuously or periodically monitored by the apparatus and thus known to the apparatus, as discussed above. The set of one or more sequential actions may be defined as discussed in connection with FIG. 3.

The apparatus further determines, in block 404, a schedule for performing the set of one or more sequential actions based on the individual duration(s) of the set of one or more sequential actions, the timing requirement and the current SoC state. In other words, the apparatus determines when each of the set of sequential actions should be performed knowing their duration and the current SoC state sot that the timing requirement is satisfied (without disrupting other operations of the SoC). The apparatus may take into account in the determining in block 404 the current SoC state as well as any subsequent (intermediary) SoC states resulting from performing the set of one or more sequential actions. For example, if the time requirement defines that the target SoC state should be reached at the latest in 200 ms and the total duration of the set of one or more sequential actions is only 20 ms, the apparatus may delay the performing of the set of one or more sequential actions (or some of them) depending on the current SoC state (in general, depending on other needs of the SoC or the apparatus in terms of, e.g., processing power). The actions in block 403, 404 may be carried out simultaneously or in parallel.

The apparatus adjusts, in block 405, the current power tree configuration of the SoC according to the set of one or more sequential actions and the associated schedule. As illustrated in FIG. 1, the apparatus (e.g., the system controller 105) may be electrically connected to the plurality of power control elements powering the SoC for performing the reconfiguring.

In some embodiments, block 404 may be omitted. In such embodiments, the adjusting in block 405 is consequently also not based on the determined schedule.

In some embodiments, no timing requirement may be provided in the request or retrieved from a database, at least not for all received requests. If no timing requirement is included in the request (or retrievable from the database), the apparatus may simply determine, in block 404, a set of one or more sequential actions to be carried out to activate an optimal power tree configuration (e.g., the most efficient power tree configuration) for the SoC without taking into account any durations of the actions based on the knowledge-based system using a current SoC state and the target SoC state.

In some embodiments, the knowledge-based system maintained in the memory in block 301 of FIG. 3 or block 401 of FIG. 4 may define also an initial power tree configuration of the SoC. The apparatus may be configured to apply said initial power tree configuration of the SoC at bootup of the SoC. The initial power tree configuration of the SoC may define which regulators are enabled or disabled (i.e., activated or deactivated) or in bypass mode and what is the output voltage of the enabled regulators (if any exist). The initial power tree configuration may also define initial power voltage of power supply pins of the SoC and initial requirements in terms of DVFS OP, activation/deactivation of one or more peripherals and/or voltages of one or more power supply pins.

Figure 5:
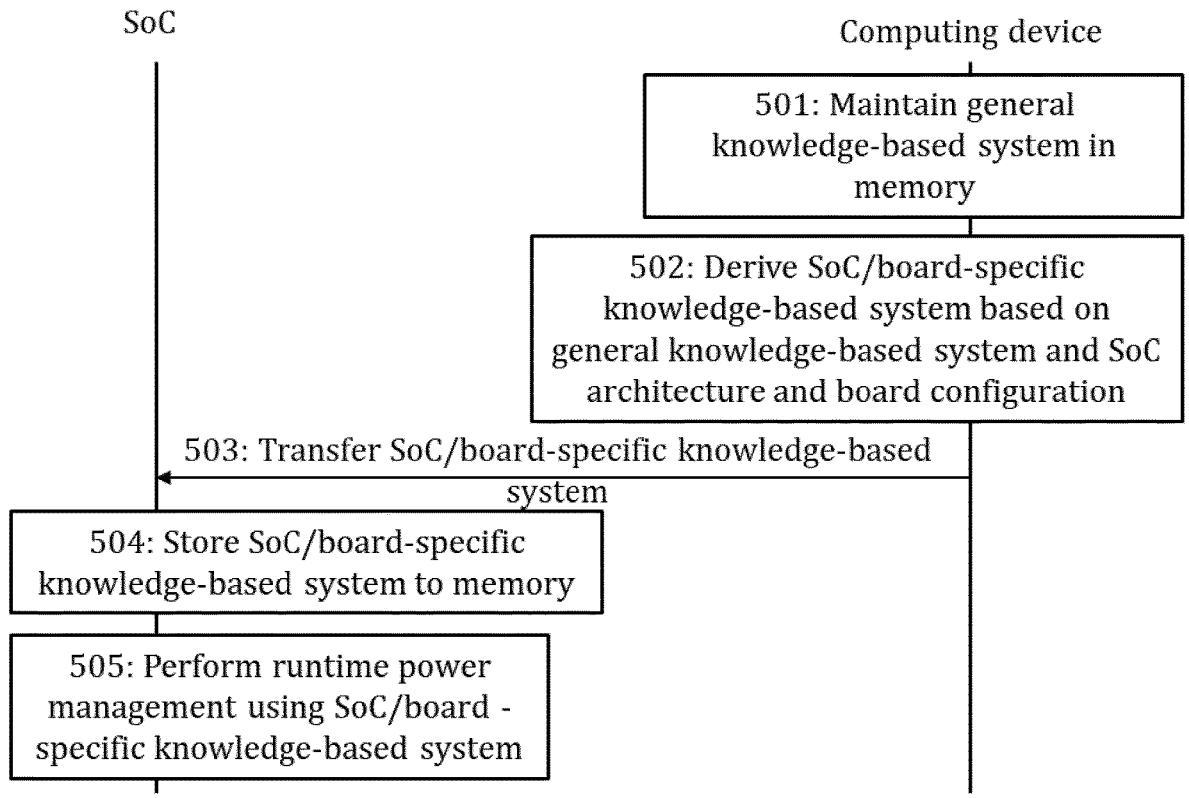

FIG. 5 illustrates a process for deriving a SoC and circuit board-specific knowledge-based system from the general knowledge-based system according to embodiments. The illustrated process involves a computing device and a SoC which may be defined as discussed in connection with elements 101, 110 of FIG. 1. The actions of the SoC may be carried out specifically by a system controller or another apparatus or computing device comprised in the SoC or communicatively connected thereto.

Referring to FIG. 5, the computing device initially maintains, in a memory, in block 501, a general knowledge-based system suitable for deriving power management information regarding a plurality of different SoC architectures and circuit board configurations. Said general knowledge-based system may be defined as discussed in connection with the knowledge-based system 200 of FIG. 2. Thus, the knowledge-based system comprises a knowledge database with a plurality of facts and rules regarding the plurality of different SoC architectures and power management thereof. The knowledge-based system enables mapping a shift from a first SoC state defined for a particular SoC architecture to a second SoC state for that SoC architecture at least to a set of one or more sequential actions starting from the first SoC state for activating a power tree configuration corresponding to said second SoC state.

The computing device derives, in block 502, a SoC and circuit board-specific knowledge-based system based on the general knowledge-based system and information on the architecture of a specific SoC (i.e., specification information on the SoC) and on associated circuit board. Said information may define, for example, the number of regulators in the SoC, the types of regulators in the SoC (e.g., LDO or buck regulator), the connections of regulators, the number and types of other power control elements (e.g., power switches and/or voltage selectors), the connections of other power control elements, peripheral(s) of the SoC, power supply pins (or power rails) of the SoC and information on how the SoC is arranged or implemented on the circuit board (e.g., information on what power is provided and where and presence and properties of elements external to the SoC). This information may define boundaries for the information (i.e., fact and rules) which are to be extracted from the knowledge database of the general knowledge-based system and included in the knowledge database of the SoC and circuit board-specific knowledge-based system (i.e., boundaries defining which information is relevant for the specific SoC/board and which is not). The computing device may query the inference engine of the general knowledge-based system so as to derive the knowledge-based system conforming to said boundaries defined by the information on the SoC architecture and the circuit board. The derived SoC and circuit board-specific knowledge-based system may correspond to the knowledge-based system of the SoC as discussed in connection with FIGS. 1, 3 and 4.

In some embodiments, the deriving of the SoC and circuit board-specific knowledge-based system may be further based on calculating a system cost function for each possible power tree configuration so as to determine the optimal power tree configuration for each SoC state defined for the SoC architecture. The computing device may include in the SoC and circuit board-specific knowledge system only the optimal power tree configurations or all the power tree configurations for a given SoC state.

The computing device transfers, in message 503, the SoC and circuit board-specific knowledge-based system to the SoC. Said SoC and circuit board specific knowledge-based system may be transferred to the SoC via a direct wired or wireless communication link between the two devices or via one or more communications networks (e.g., the Internet) to which the two devices are connected. The transfer may be performed via an interface of the SoC which may be a wired interface (e.g., a USB interface) or a wireless interface (e.g., Wi-Fi interface). In general, said interface may be any interface of the SoC mentioned in connection with element 101 of FIG. 1.

The SoC stores, in block 504, the SoC and circuit board-specific knowledge-based system to a memory of the SoC (or a memory connected to the SoC).

The SoC performs, in block 505, runtime power management using the SoC and circuit board-specific knowledge-based system as described in connection with FIG. 3 or 4.

Figure 6:
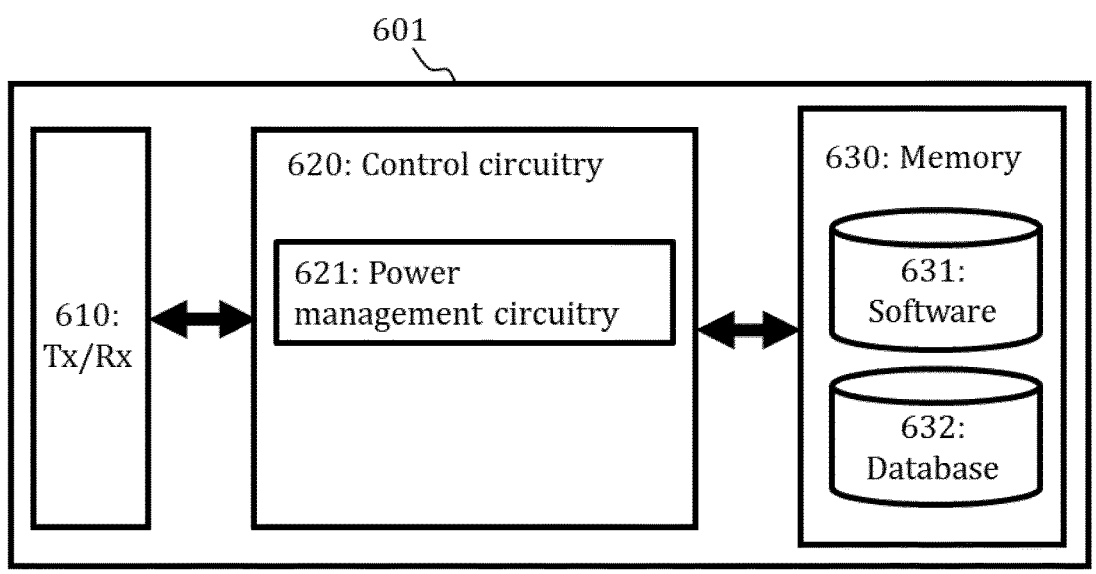
FIG. 6 illustrates an apparatus according to an embodiment.

FIG. 6 illustrates an exemplary apparatus 601 configured to carry out at least the functions described above in connection with at least some of the processes illustrated in FIGS. 1 to 5. The apparatus may be an electronic device comprising electronic circuitries. The apparatus may be a separate entity or a plurality of separate entities. Specifically, the apparatus may be or be comprised in a SoC. In some embodiments, the apparatus may correspond to a system controller of a SoC (e.g., the system controller 105 of FIG. 1).

The apparatus may comprise a control circuitry 610 such as at least one processor, and at least one memory 630 including a computer program code (software) 631 wherein the at least one memory and the computer program code (software) are configured, with the at least one processor, to cause the apparatus to carry out any one of the embodiments of an apparatus for a SoC described above.

The memory 630 may be implemented using any suitable data storage technology, such as semiconductor based memory devices, flash memory, magnetic memory devices and systems, optical memory devices and systems, fixed memory and removable memory. The memory may comprise a database 632 which may be or comprise the database as described in relation to previous embodiments. The memory 630 may be connected to the communication control circuitry 620 via an interface.

The apparatus may further comprise interfaces 610 comprising hardware and/or software for realizing connectivity according to one or more communication protocols. The interfaces 610 may comprise, for example, interfaces enabling the connections between the apparatus 601 and other apparatuses internal and/or external to the SoC. The interfaces 610 may comprise any interfaces of the SoC mentioned in connection with FIG. 1. The interfaces 610 may provide the apparatus with communication capabilities to communicate in the cellular communication system and enable communication with network nodes (e.g., access nodes), terminal devices and one or more core network nodes, for example. The interfaces 610 may provide a connection to a computing device as described in connection with FIG. 1. The interfaces 610 may comprise standard well-known components such as an amplifier, filter, frequency-converter, (de)modulator, and encoder/decoder circuitries and one or more antennas.

Referring to FIG. 6, the communication control circuitry 620 may comprise power management circuitry 621 configured to perform power management of the SoC according to any of embodiments discussed in connection with any of FIGS. 2 to 4.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with any of FIGS. 3 to 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of any of FIGS. 3 to 5 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with any of FIGS. 3 to 5 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Embodiments described herein are applicable to systems defined above but also to other systems. The specifications of the systems and their elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for power management of a system on a chip, SoC, the apparatus comprising means for performing:
   maintaining, in a memory, a knowledge-based system for power management of the SoC, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state and at least one of the plurality of rules also mapping a shift from a first SoC state to a second SoC state to a total duration and/or one or more individual durations for a set of one or more sequential actions for activating a power tree configuration;
   receiving a request for adjusting a current power tree configuration of the SoC so as to match a target SoC state, wherein the request comprises a timing requirement defining a time or a time range when the target SoC state should be reached;
   determining a set of one or more sequential actions to be carried out to activate an optimal power tree configuration for the SoC based on the knowledge-based system using a current SoC state, the target SoC state and the timing requirement as an input for ensuring that the timing requirement is satisfied; and
   adjusting the current power tree configuration of the SoC according to the set of one or more sequential actions.

2. The apparatus according to claim 1, wherein at least one set of one or more sequential actions comprised in the knowledge-based system comprises a plurality of sequential actions.

3. The apparatus according to claim 1, wherein the apparatus is a system controller of the SoC.

4. The apparatus according to claim 1, wherein the optimal power tree configuration is defined as the power tree configuration associated with the highest electrical efficiency corresponding to the target SoC state.

5. The apparatus according to claim 1, wherein said at least one of the plurality of rules maps a shift from a first SoC state to a second SoC state at least to said one or more individual durations and the means are further configured to perform:
   determining a schedule for performing the set of one or more sequential actions based on one or more individual durations of the set of one or more sequential actions, the timing requirement and the current SoC state; and
   performing the adjusting of the current power tree configuration according to the schedule.

6. The apparatus according to claim 1, wherein the SoC is powered by a plurality of power control elements and at least one set of one or more sequential actions defined by the knowledge-based system and the determined set of one or more sequential actions comprises one or more actions relating to changing one or more configurations of one or more of said plurality of power control elements.

7. The apparatus according to claim 6, wherein the plurality of power control elements comprise one or more voltage regulators, one or more power switches and/or one or more voltage selectors.

8. The apparatus according to claim 7, wherein the plurality of power control elements comprise at least the one or more voltage regulators and the at least one set of one or more sequential actions defined by the knowledge-based system and the determined set of one or more sequential actions comprises one or more actions of one or more of the following types:
   activating a voltage regulator;
   deactivating a voltage regulator;
   setting an output voltage of a voltage regulator to a certain value;
   enabling a voltage regulator and setting an output voltage of a voltage regulator to a certain value;
   enabling a bypass mode of a voltage regulator;
   disabling a bypass mode of a voltage regulator;
   disabling a bypass mode of a voltage regulator and setting an output voltage of a voltage regulator to a certain value; and
   changing one or more properties of a voltage regulator.

9. The apparatus according to claim 7, wherein the plurality of power control elements comprise at least the one or more power switches and the at least one set of one or more sequential actions defined by the knowledge-based system and the determined set of one or more sequential actions comprises one or more actions of one or more of the following type:
   switching on a power switch; and
   switching off a power switch.

10. The apparatus according to claim 7, wherein the plurality of power control elements comprise at least the one or more voltage selectors and the at least one set of one or more sequential actions defined by the knowledge-based system and the determined set of one or more sequential actions comprises one or more actions of the following type:
   selecting an output voltage from a plurality of input voltages fed to a voltage selector.

11. The apparatus according to claim 1, wherein each SoC state comprised in the knowledge-based system, the current SoC state and the target SoC state is defined through one or more operational properties of the SoC.

12. The apparatus according to claim 1, wherein the one or more operational properties of the SoC comprise, for at least one SoC state comprised in the knowledge-based system and the target SoC state, one or more operational properties of one or more of the following types:
   a value for a dynamic frequency and voltage scaling operating point, DFVS OP, of a processor of the SoC;
   an ON/OFF state of an internal unit or peripheral of the SoC;
   an ON/OFF state of an external unit or peripheral of the SoC; and
   a voltage value or a range of voltage values for a power supply pin of the SoC.

13. The apparatus according to claim 11, wherein each shift between SoC states defined in the plurality of rules is defined as a shift from a first SoC state to a second SoC state differing from the first SoC state by at least one operational property of the SoC.

14. The apparatus according to claim 1, wherein the knowledge-based system defines an initial power tree configuration of the SoC, the means being further configured to perform:
   applying the initial power tree configuration of the SoC at bootup of the SoC.

15. The apparatus according to claim 1, wherein the means comprise:
   at least one processor; and
   at least one memory including computer program code, the at least one memory and computer program code configured to, with the at least one processor, cause the performance of the apparatus.

16. A system on a chip comprising the apparatus according to claim 1.

17. A method comprising:
   maintaining, in a memory of an apparatus for power management of a system on a chip, SoC, a knowledge-based system for power management of the SoC, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state and at least one of the plurality of rules also mapping a shift from a first SoC state to a second SoC state to a total duration and/or one or more individual durations for a set of one or more sequential actions for activating a power tree configuration;
   receiving, by the apparatus, a request for adjusting a current power tree configuration of the SoC so as to match a target SoC state, wherein the request comprises a timing requirement defining a time or a time range when the target SoC state should be reached;
   determining, by the apparatus, a set of one or more sequential actions to be carried out to activate the optimal power tree configuration for the SoC based on the knowledge-based system using a current SoC state, the target SoC state and the timing requirement as an input for ensuring that the timing requirement is satisfied; and
   adjusting, by the apparatus, the power tree configuration of the SoC according to the set of one or more sequential actions.

18. The method of claim 17, further comprising:
   maintaining, in a memory of a computing device communicatively connected to the SoC, a general knowledge-based system for deriving power management information regarding a plurality of different SoC architectures and circuit board configurations, wherein the knowledge-based system comprises a knowledge database with a plurality of facts and rules regarding the plurality of different SoC architectures and circuit board configurations and power management thereof, the plurality of rules enabling deriving a plurality of mappings between a shift from a first SoC state defined for a particular SoC architecture to a second SoC state for that SoC architecture at least to a set of one or more sequential actions starting from the first SoC state for activating a power tree configuration corresponding to said second SoC state;
   deriving, by the computing device, the knowledge-based system specific to an architecture of the SoC and associated board configuration based on the general knowledge-based system and information on the architecture of the SoC and a circuit board configuration associated with the SoC; and storing the knowledge-based system to the memory of the apparatus for power management of the SoC for enabling its runtime operation.

19. A non-transitory computer readable medium having stored thereon instructions that, executed by a processor in an apparatus, cause the apparatus to perform at least the following:

receiving a request for adjusting a current power tree configuration of a system on a chip, SoC, so as to match a target SoC state, wherein the request comprises a timing requirement defining a time or a time range when the target SoC state should be reached;

determining a set of one or more sequential actions to be carried out to activate an optimal power tree configuration for the SoC based on a knowledge-based system for power management of the SoC using a current SoC state, the target SoC state and the timing requirement as an input for ensuring that the timing requirement is satisfied, wherein the knowledge-based system comprises a plurality of rules, each of the plurality of rules mapping a shift from a first SoC state to a second SoC state at least to a set of one or more sequential actions starting from the first SoC state for activating a power tree configuration corresponding to said second SoC state and at least one of the plurality of rules also mapping a shift from a first SoC state to a second SoC state to a total duration and/or one or more individual durations for a set of one or more sequential actions for activating a power tree configuration; and adjusting the current power tree configuration of the SoC according to the set of one or more sequential actions.

* * * * *